No. 816,607. PATENTED APR. 3, 1906.
W. SCHMIDT.
PISTON VALVE.
APPLICATION FILED NOV. 7, 1904.
2 SHEETS—SHEET 1.
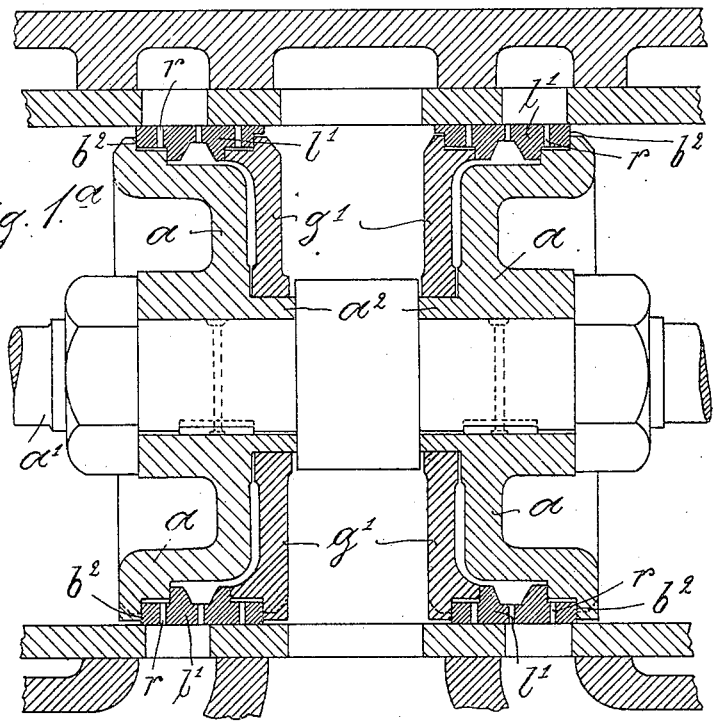
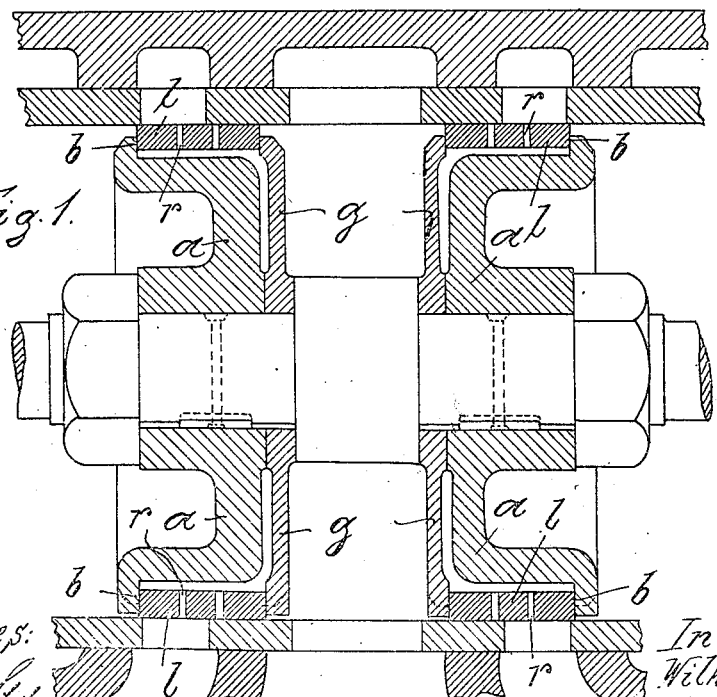
Witnesses:
Arthur Scholz
Emil Kayser
Inventor:
Wilhelm Schmidt
by Roberts &c.
Attorney No. 816,607. PATENTED APR. 3, 1906.
W. SCHMIDT.
PISTON VALVE.
APPLICATION FILED NOV. 7, 1904.
2 SHEETS—SHEET 2.
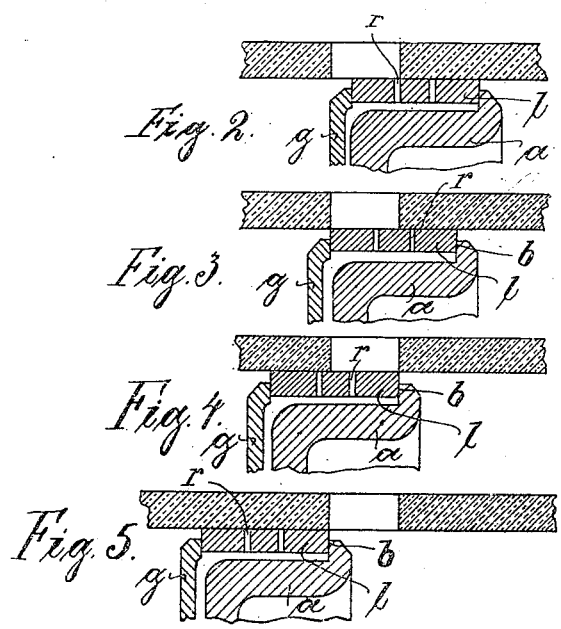

UNITED STATES PATENT OFFICE.

WILHELM SCHMIDT, OF WILHELMSHÖHE, GERMANY.

PISTON-VALVE.

No. 816,607.   Specification of Letters Patent.   Patented April 3, 1906.

Application filed November 7, 1904. Serial No. 231,758.

*To all whom it may concern:*

Be it known that I, WILHELM SCHMIDT, a subject of the King of Prussia, German Emperor, and a resident of Wilhelmshöhe, near Cassel, in the Province of Hesse-Nassau, German Empire, have invented certain new and useful Improvements in Packing or Check Ring Devices for Piston-Valves, of which the following is an exact specification.

My invention relates to improvements in packing or check ring devices for piston-valves, and more especially to such check-ring devices in which split check or piston rings with radial bores are used, so as to allow the steam to enter the inner side of the rings, thereby preventing the split rings from being compressed and pressed off from the inclosing walls. As the pressure differences often change, it is desirable to keep the split rings at times in their proper position—that is to say, if in the stretched state against the inclosing walls—and to release the rings again, if required.

The subject of my invention now consists in means for laterally pressing fast the packing-rings in certain position, but at times releasing the rings again. For this purpose a comparatively great lateral pressure is necessary, which is obtained by sparing out the piston-valve in the middle down to the piston-rod and arranging upon this side of the piston-valve a flexible or axially-movable pressure-plate of great surface, so that the inside steam-pressure can firmly press the rings in certain positions against the outside surfaces of the piston-valve.

In order to make my invention more clear, I refer to the accompanying drawings, in which—

Figure 1 is a longitudinal section through a valve-chest and a piston-valve arranged therein according to my invention. Fig. 1ª shows a further constructional form of my piston-valve in a longitudinal section. Figs. 2 to 5 illustrate different positions of the piston-valve and one of its split rings with regard to a port.

In the drawings, Fig. 1 shows a piston-valve consisting of two parts $a\ a$, carried by the valve-rod $a'$. In this arrangement $l$ is a flat split ring arranged in a circumferential groove $g$ and bearing against the surfaces $b$ of the valve $a$. The split ring is provided in known manner with small radial bores $r$, so as to allow the gas or steam to enter behind the split ring, whereby at times this ring is released and only gradually pressed against the walls of the valve-chest. $g$ is an elastic plate partially movably mounted upon the rod $a'$ and bearing with its outer edge against the gas-pressure side of the split ring $l$.

My improved piston-valve operates in the following manner: During the steam-admitting period steam can flow through the bores $r$ to the inner side of the packing-ring and in the annular space between the plate $g$ and the valve-body $a$, and the same pressure is acting before and behind the said plate. (See Fig. 2.) Therefore the ring $l$ is released from the plate $g$ and pressing against the edge $b$ of the part $a$ does not take place. During the expansion period the pressure on the inner side of the ring is reduced. As the plate $g$ is flexible and the steam-pressure rests upon the whole outer surface of the plate $g$, the latter will more or less press against the split ring, thereby pressing the latter more or less against the surface $b$ of the piston-valve, thus insuring the momentary position of the packing-ring. (See Figs. 3 to 5.) When the steam is compressed in the steam-cylinder, the pressure arises on the inner side of the ring in consequence of the bores $r$, and the plate $g$ releases again the latter.

In Fig. 1ª a step-like split ring $l'$ is shown bearing against the surface $b^2$ of the piston-valve $a$. This ring $l'$ is also provided in known manner with small radial bores $r$, so as to allow the steam to enter behind the split ring. At the pressure side of the split ring a pressure-plate $g'$ is provided, which is somewhat axially movable upon the sleeve $a^2$ of the valve $a$. Also in this arrangement the gas or steam can press upon the whole inside surface of the pressure-plate, whereby the split ring is according to the gas-pressure present more or less pressed against the surfaces $b^2$ of the piston, thereby holding the split ring in its momentary position.

Having thus fully described the nature of my invention, what I desire to secure by Letters Patent of the United States is—

1. A piston-valve for steam or other fluid motive-power engines with two distinct valve-bodies, each of them consisting of a cylindrical part $a$ and a movable plate, and a packing-ring having radial bores, the cylindrical part $a$ having a circumferential groove for putting in the split packing-ring, for the purpose as described.

2. A piston-valve for steam or other fluid motive-power engines with two distinct valve-bodies, each of them consisting of a cylindrical part *a*, an elastical plate partially movable and a packing-ring having small radial bores, the cylindrical part *a* having a circumferential groove for putting in a split packing-ring, for the purpose as described.

3. A piston-valve for steam or other fluid motive-power engines with two distinct valve-bodies, each of them consisting of a cylindrical part *a*, a movable plate, forming an annular space together with the part *a*, and a packing-ring having small radial bores, the cylindrical part *a* having a circumferential groove for putting in the split packing-ring, the small radial bores therein serving for compensating the steam-pressure on the inner and outer side of the packing-ring, for the purpose as described.

4. A piston-valve for steam or other fluid motive-power engines with two distinct valve-bodies, each of them consisting of a cylindrical part *a*, an elastic plate partially movable, forming an annular space together with the part *a* and a packing-ring having small radial bores, the cylindrical part *a* having a circumferential groove for putting in the split packing-ring, the small radial bores therein serving for compensating the steam-pressure on the inner and outer side of the packing-ring, for the purpose as described.

In witness whereof I have hereunto set my hand in the presence of two witnesses.

WILHELM SCHMIDT.

Witnesses:
HENRY HASPER,
WOLDEMAR HAUPT.